US 6,405,327 B1

United States Patent
Sipple et al.

(10) Patent No.: US 6,405,327 B1
(45) Date of Patent: Jun. 11, 2002

(54) APPARATUS FOR AND METHOD OF AUTOMATIC MONITORING OF COMPUTER PERFORMANCE

(75) Inventors: Ralph E. Sipple, Shoreview; Bruce T. Kunz, Eagan; Lee B. Hansen, Forest Lake, all of MN (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/136,447

(22) Filed: Aug. 19, 1998

(51) Int. Cl.[7] .............................................. G06F 11/00
(52) U.S. Cl. ......................................................... 714/39
(58) Field of Search ........................ 711/114; 709/206, 709/239; 707/8, 10; 710/71; 714/47, 39; 345/336; 702/181

(56) References Cited

U.S. PATENT DOCUMENTS

| | | | |
|---|---|---|---|
| 3,818,458 A | 6/1974 | Deese ...................... 340/172.5 |
| 4,034,353 A | 7/1977 | Denny et al. ................ 364/200 |
| 4,166,290 A | 8/1979 | Furtman et al. ............. 364/200 |
| 4,231,106 A | 10/1980 | Heap et al. .................. 364/900 |
| 4,367,525 A | 1/1983 | Brown et al. ................ 364/200 |
| 4,458,309 A | 7/1984 | Wilder, Jr. ................... 364/200 |
| 4,521,849 A | 6/1985 | Wilder, Jr. ................... 364/900 |
| 4,590,550 A | 5/1986 | Eilert et al. .................. 364/200 |
| 4,623,984 A | 11/1986 | Yokokawa et al. .......... 364/900 |
| 4,654,848 A | 3/1987 | Noguchi ....................... 371/20 |
| 4,821,178 A | 4/1989 | Levin et al. ................. 364/200 |
| 4,905,171 A | 2/1990 | Kiel et al. .................... 364/551 |
| 5,051,944 A | 9/1991 | Fetterolf et al. ............ 364/900 |
| 5,062,055 A | 10/1991 | Chinnaswamy et al. .... 364/513 |
| 5,067,107 A | 11/1991 | Wade ........................... 395/500 |
| 5,123,017 A | 6/1992 | Simpkins et al. ........... 371/15.1 |
| 5,166,890 A | 11/1992 | Smischny ............... 364/551.01 |
| 5,193,179 A | 3/1993 | Laprade et al. .............. 395/575 |
| 5,210,862 A | 5/1993 | DeAngelis et al. .......... 395/575 |
| 5,245,638 A | 9/1993 | Gustafson .................... 395/575 |
| 5,276,809 A | 1/1994 | Chisvin et al. .............. 395/250 |
| 5,581,482 A | 12/1996 | Wiedenman et al. .... 364/551.01 |
| 5,745,915 A * | 4/1998 | Cooper et al. ............... 711/114 |
| 5,758,149 A * | 5/1998 | Bierma et al. .................. 707/8 |
| 5,832,310 A * | 11/1998 | Morrissey et al. ............. 710/71 |
| 5,864,738 A * | 1/1999 | Kessler et al. ............... 709/239 |
| 5,875,119 A * | 2/1999 | Bauman et al. .............. 702/181 |
| 5,917,485 A * | 6/1999 | Spellman et al. ............ 345/336 |
| 5,924,097 A * | 7/1999 | Hill et al. ...................... 707/10 |
| 6,003,145 A * | 12/1999 | Hong ............................ 714/47 |
| 6,065,138 A * | 5/2000 | Gould et al. .................. 714/47 |
| 6,101,531 A * | 8/2000 | Eggleston et al. ........... 709/206 |
| 6,167,538 A * | 12/2000 | Neufeld et al. ............... 714/47 |

* cited by examiner

Primary Examiner—Zarni Maung
(74) Attorney, Agent, or Firm—Charles A. Johnson; Mark T. Starr; Nawrocki, Rooney & Sivertson, PA (57) ABSTRACT

The present invention overcomes many of the disadvantages associated with the prior art by providing an automated, real time performance monitoring facility which runs periodically as a background process in a computer system. This invention preferably uses performance data collection sites already present in the hardware of the computer system, microcode and/or operating system software. At a user selectable period of time, a sampling of key performance factors is taken from the performance data collection sites. The performance monitor then analyzes the sampled results by comparing the collected results against two or more performance threshold levels (such as early warning or actual performance limiters) for each performance criteria. If either an actual or early warning performance limiter is detected, an easy-to-understand color coded informational message is provided to a computer operator identifying subsystems that are performance inhibitors along with suggestions of specific upgrade solutions that will address the identified performance problems.

31 Claims, 10 Drawing Sheets

APPARATUS FOR AND METHOD OF AUTOMATIC MONITORING OF COMPUTER PERFORMANCE

BACKGROUND OF THE INVENTION

1. Field of the Invention

The present invention is generally related to general purpose, stored program, digital computers and more particularly relates to an automatic, resource efficient means for monitoring the performance of various portions of a computer system.

2. Description of the Prior Art

The term "performance monitoring" refers to the process of monitoring the performance of various system components within a computer system while the computer system is operating under normal operating conditions. Performance monitoring is a key factor in the operation and maintenance of many of today's complex computer systems.

In the past several decades, the demand on computer systems has steadily increased. Today's software packages require much more processing power and storage capacity than those produced just a few years ago. In addition, many more people are using computers to do tasks that were traditionally done using other means.

Many factors may reduce the optimal performance of a computer system. First, there may be a bottleneck at the input/output (I/O) interface causing the central processing unit (CPU) to be idling a substantial portion of time waiting for data. Even a simple relief on a key constraint in performance can greatly increase the throughput on a system. In the case of I/O, there may not be sufficient channels or disks to provide adequate response time. Second, there may be an insufficient number of processor cycles available to accomplish the program workload awaiting execution. In an interactive or high volume transaction system, such as an airline reservation system or a bank transaction system with thousands of terminals and ATM stations, work is held up at the human interface. This is known as latent workload and can result in unacceptable levels of service. Finally, there may not be enough internal memory within the computer system to store all of the computer programs and data that are to be simultaneously executed and used by the data processing system. This can result in paging. Paging occurs when internal memory limitations require the resulting data from the computer program to be loaded and unloaded from an external storage device each time a process becomes active. Paging data in and out of external storage can greatly increase the time required to complete a given process resulting in unacceptable levels of performance.

The above examples are given only to illustrate the necessity for performance monitoring techniques within a computer system and are not intended as an exhaustive list. It is recognized that many other performance inhibitors exist in modern computer systems and that many of them may be detected by using performance monitoring techniques. However, the basic metrics used in determining performance and levels of service in modern computer systems are input/output service time, processor utilization, and memory utilization.

Performance monitoring of today's computer systems is typically provided by using off the shelf software packages. Examples of such off-the-shelf performance monitoring software packages include the Viewpoint program available from Datametrics, the ALICE module of the SYSTAR products, and Online Activity Monitor (OSAM)/CMF Baseline available from TeamQuest. These software packages are executed on a particular computer or computer network and generate performance data based on a number of preselected factors. One such method is discussed in "Getting Started in 1100/2200 Performance Monitoring", by George Gray, UNISPHERE Magazine, November 1993. All of the performance monitoring packages listed above use the Software Instrumentation Package (SIP), available from Unisys Corporation, for data collection.

These off the shelf software packages may prove to be useful for some users but they are not an ideal solution for others. Problems that exist with these software packages include: (1) only the performance parameters selected by the software developer are available to the user; (2) the software packages are typically only available for standard computer systems and therefore cannot be used during the development stage of a computer system or on less known computer systems without independent development of the performance monitoring software; (3) the software packages are typically run concurrently with and on the same CPU as the user software and therefore may slow down systems performance (in some cases, as much as 5–10%) while the performance monitoring software is executed; and (4) only hardware that is accessible by the software package, like CPU activity and I/O requests, can be monitored by these software packages.

Problems (1) and (2) listed above may be minimized by having the user write a customized performance monitoring software package for the user's system. However, this requires a significant investment in resources to develop such a program. Problems (3) and (4) listed above cannot typically be eliminated by having the user write a customized software package for several reasons. First, only the nodes within the computer system that are accessible to the performance monitoring software can be monitored. This limitation is a result of having the performance monitoring strategy determined after the computer hardware is designed. Many nodes within a computer system are neither controllable nor observable via software. Second, the performance monitor software is run on the same CPU as the user programs and therefore may decrease overall system performance. Since the performance monitoring software may effect the performance of the system in which the software is attempting to measure, the overall accuracy of the results obtained by the performance monitoring software packages may be limited.

Performance monitoring is often a highly technical process requiring an analyst with many years of experience to examine the performance monitoring results. In a typical scenario, a user first suspects he/she has a problem. The user may then run one or more programs over a period of time to collect utilization statistics, archive and compile the results, and give the data to an analyst, who will do a detailed inspection of the user data, and issue a diagnosis and recommendation. This process can take weeks to months to complete.

Another approach to performance monitoring is to use an external monitor. The external monitor is attached to the system, and often requires a first specialist to attach the device and a second specialist to interpret the results. This approach is both expensive and time consuming.

In many instances, users are unaware that their computer systems are either at or approaching performance limits, and thus performance monitoring is never initiated. When faced with a throughput problem, some customers will simply purchase a new computer system, unaware that the addition of a simple hardware upgrade to their existing computer system would provide better performance at a fraction of the cost of a new computer system.

SUMMARY OF THE INVENTION

The present invention overcomes many of the disadvantages associated with the prior art by providing an automated, real time performance monitoring facility for a computer system which runs periodically as a background process. This invention preferably uses built in performance data collection sites already present in the hardware of the computer system, microcode and/or operating system software. At a user selectable period of time, a sampling of key performance factors is taken from the performance data collection sites. The performance monitor then analyzes the sampled results by comparing the results against two or more performance threshold levels for each performance criteria. In an illustrative embodiment, two performance threshold levels (early warning and actual) are established for the performance criterion of processor utilization. When processor utilization reaches the 90 percent performance threshold, for example, an early warning performance limiter is detected. If the processor utilization reaches the 100 percent performance threshold, for example, an actual performance limiter is detected. If either an early warning or actual performance limiter is detected, an easy-to-understand informational message is provided to a computer operator identifying subsystems that are performance inhibitors along with suggestions of specific upgrade solutions that will address the identified performance problems.

An advantage of the present invention is that it is an automated, real time process that runs periodically during the normal operation of the computer. In past practice, performance monitoring often required an analyst with many years of experience to examine a system. This was often a procedurally complex, time consuming process, taking weeks to months to complete. In the present invention, an automated background process periodically samples a limited set of special purpose data collectors located at key performance sites in the computer system, compares the sampled results against a set of two or more performance thresholds for each performance criterion, and automatically issues a warning to a computer operator of any early warning or actual performance limiter. No special expertise is required to perform the analysis, or interpret the results.

The results are preferably a simple color coded message, much like a "service engine soon" warning light on an automobile's instrumentation.

Another advantage of the present invention is that minimal overhead is required. In the past, performance monitoring approaches could be quite inefficient, often requiring as much as 5–10% of system resources to monitor operations. In the present invention, the monitoring process preferably utilizes special purpose data collectors that are designed into the hardware, microcode and/or operating system software of a computer system. Further, the monitoring process of the present invention preferably runs only about 12 times an hour for approximately 15 seconds in order to gather the information from the performance data collector sites, analyze the results, and issue any necessary warnings.

Finally, since the performance monitoring process is automatically done as part of the normal operation of the computer, a user does not need to know or even suspect that there are performance problems in their computer system in order to receive notification of early warning or actual performance limiters. This present invention takes a proactive approach to detection of performance problems, often notifying the user of a early warning or actual problem even before the user suspects there is a problem, thus allowing the user adequate time to take measures to alleviate the problem.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The following detailed description should be read with reference to the drawings in which like elements in different drawings are numbered identically. The drawings, which are not necessarily to scale, depict selected embodiments and are not intended to limit the scope of the invention.

Figure 1A:
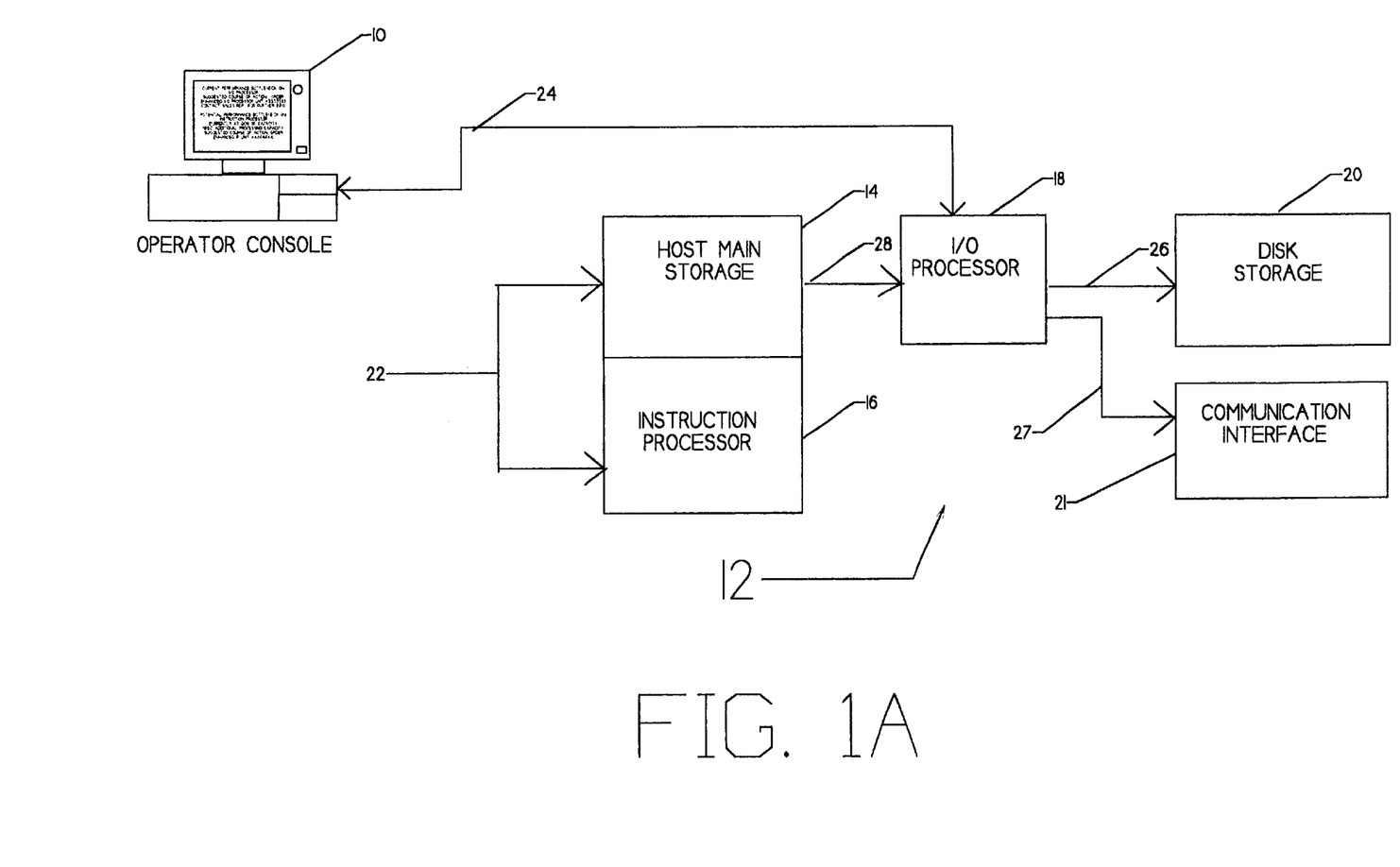
FIG. 1A is a block diagram of a typical data processing system.

FIG. 1A is a block diagram of a typical data processing system. This data processing system comprises an operator console 12, a host computer 12, an instruction processor 16, a main storage unit within the host computer (memory) 14, an input/output (I/O) processor 18, a communication interface 21, and a disk storage device 20.

Instruction processor 16 is coupled to the main storage unit within the host computer (memory) 14 via wire 22. The operator console is coupled to the I/O processor 18 via wire 24. The I/O processor 18 is coupled to the main storage unit within the host computer (memory) 14 via wire 28. Finally the disk storage device 20, and the communication interface 21 are coupled to the I/O processor via wires 26 and 27, respectively.

This figure illustrates three main subsystems within a data processing system where performance bottlenecks may have a dramatic impact on data throughput. These three main subsystems are the main storage unit (memory) 14, the I/O processor 18, and the instruction processor 16. The three subsystems listed above should not be viewed as an exclusive list of computer subsystems that have a dramatic impact on data throughput, nor should the three subsystems be viewed as the only subsystems whose performance can be effectively monitored.

Figure 1B:
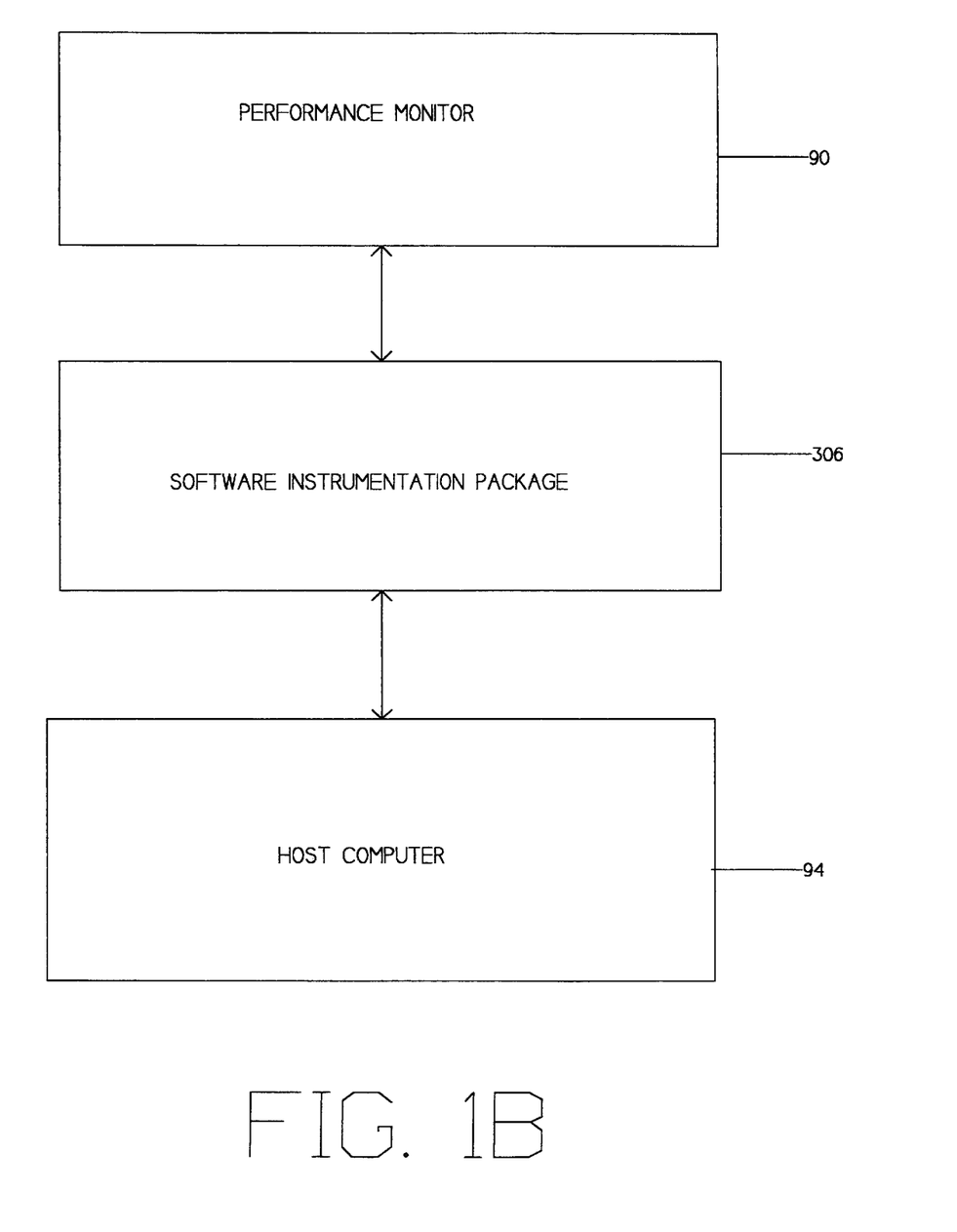
FIG. 1B is a layered representation of the performance monitoring levels for a data processing system.

FIG. 1B is a layered representation of the performance monitoring levels for a data processing system. The Software Instrumentation Package (SIP) 306 runs on a host computer 94 as a background process. In a preferred embodiment, SIP 306 runs on a 2200 series mainframe computer available from Unisys Corporation. The purpose of SIP 306 is to periodically gather performance information on a number of subsystems within the host computer 94. SIP 306 is integrated into the operating system of the host computer. The information gathered by SIP 306 is extensive and at a very detailed level that is only useful in its raw form to an expert in performance monitoring. The performance monitor 90 of the current invention will periodically gather and analyze a limited subset of the information provided by SIP 306, and provide users of the data processing system with a simplified automatic notification of performance bottlenecks within the major subsystems of a host computer 94. In essence, the performance monitor 90 of the present invention acts as a filter for the performance information generated by the SIP 306 running on the host computer 94, reducing and simplifying the performance information into an easy-to-understand "early warning system" for performance bottlenecks within a data processing system.

Figure 2:
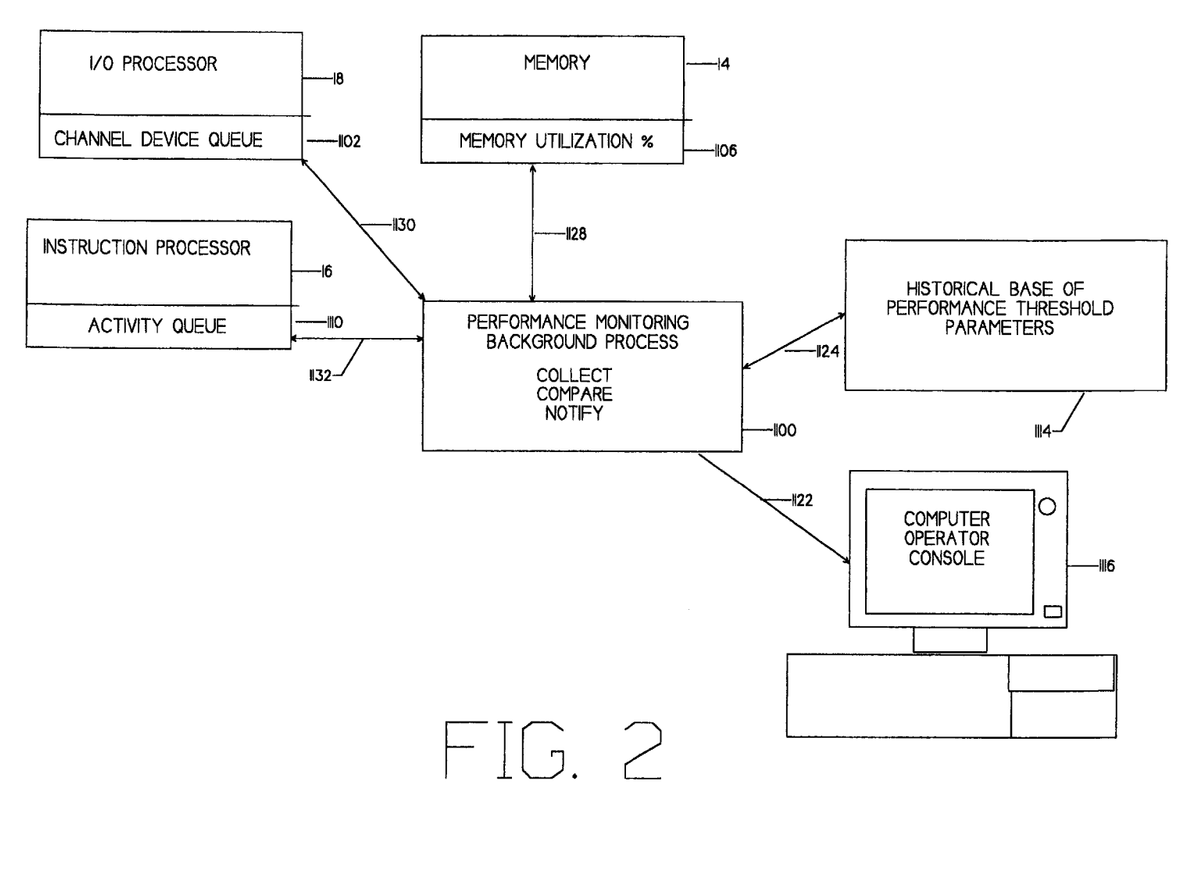
FIG. 2 is a generalized, block-oriented functional diagram of the performance monitoring process.

FIG. 2 is a generalized, block-oriented functional diagram of the performance monitoring process. The automatic performance monitor 1100 is preferably started on a computer system as a batch job, which runs periodically as a background process. In a preferred embodiment, the process is executed on a Unisys 2200 series mainframe computer. The performance monitor includes three main phases of operation: 1) the collection phase 2) the compare phase and 3) the notification phase.

During the collection phase of the performance monitor 1100, information from performance data collection sites 1102, 1106, and 1110 located within key operational areas of the computer system 14, 16, and 18 is periodically gathered. In a preferred embodiment these key operational areas include the I/O processor 18, the instruction processor 16, and memory 14. Each of these key operational areas 14, 16, and 18 contains built in performance data collection points 1102, 1106 and 1110 already present in the hardware, microcode, and operating system software of the computer system.

In a preferred embodiment, performance data representing the percentage of total memory utilization is stored as a table value within the operating system software of the computer system 1106. Channel device queue time values for the I/O processor (hardware service times) are stored in a performance data collection microcode site 1102. Finally, the number of entries in the activity queue for the instruction processor awaiting execution is also stored in a data collection site within the operating system software of the data processing system 1110.

At a predefined period of time (by default, every 15 minutes), the performance monitoring procedure 1100 "wakes up" and gathers performance information from the performance data collection sites 1102, 1106 and 1110. The present invention allows much flexibility in the gathering of performance information through the use of a set of user assignable parameters for controlling the frequency and duration of the collection. This set of user assignable parameters includes a first parameter for defining a time period between the data point collections, a second parameter defining the total time length for a set of data point collections, and a third parameter defining the start time for running each of the sets of data point collections.

The performance monitor 1100 then analyzes the collected performance results from each of the three key operational areas of the data processing system 14, 16 and 18 by comparing these results against a set of two or more performance thresholds 1114 within each of the three key operational areas, identifying any performance limiters. In an illustrative embodiment, two performance threshold levels (early warning and actual) are established for the key operational area of processor utilization. If processor utilization reaches the 90 percent performance threshold, an early warning performance limiter is detected. If the processor utilization reaches the 100 percent performance limit, an actual performance limiter is detected. If either an early warning or actual performance limiter is detected, an easy-to-understand informational message is provided to a user such as a computer operator identifying subsystems that are performance inhibitors along with suggestions of specific upgrade solutions that will address the identified performance problems.

The final phase of operation of the performance monitor 1100 is the notification phase. Here, the performance monitor 1100 preferably formulates a message to display on a computer operator console 1116, summarizing any early warning and/or actual performance problems detected in any of the key operational areas of the data processing system. This message will be sent to the computer operator console 1116 through interface 1122.

Figure 3:
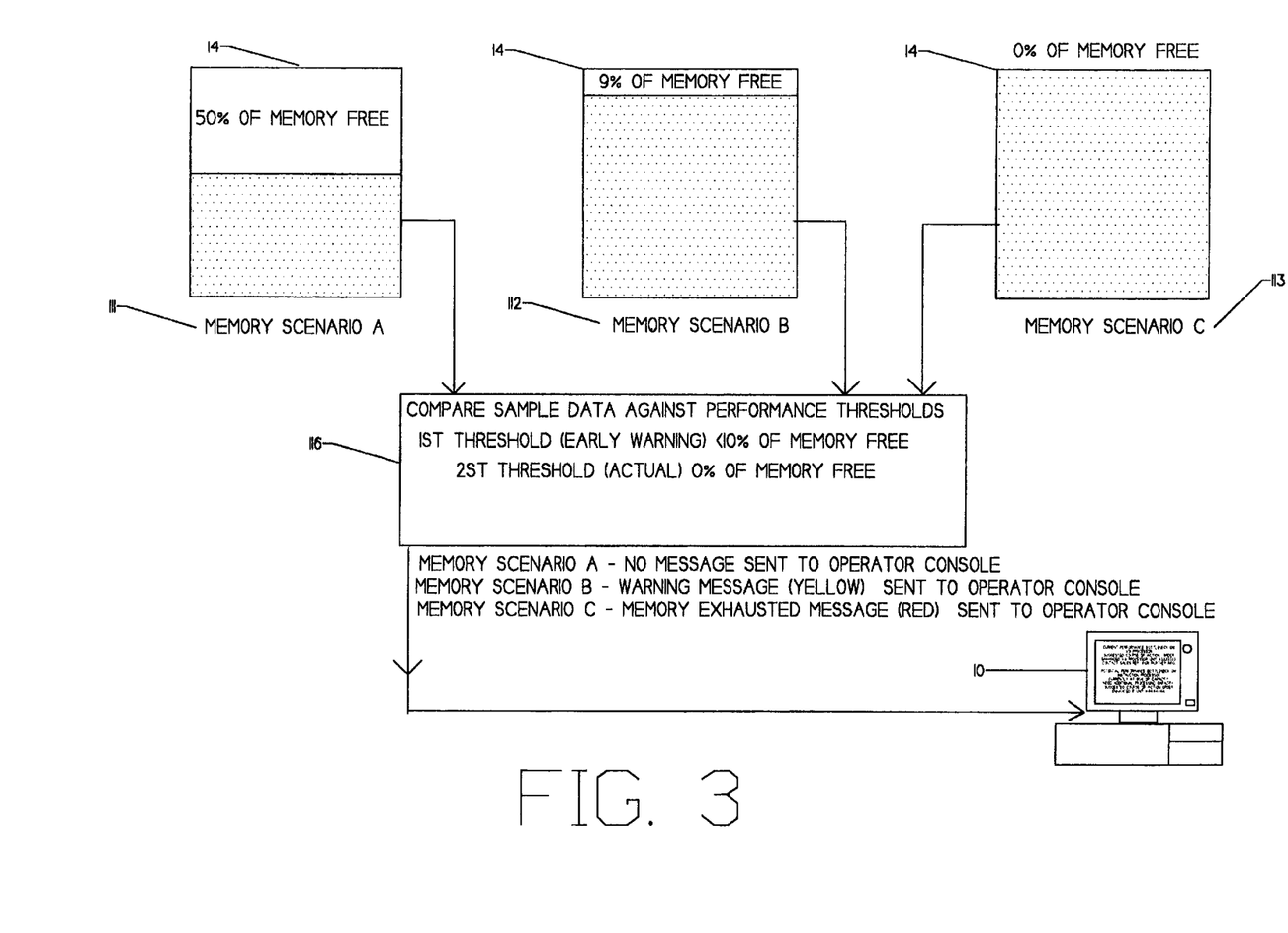
FIG. 3 is a block diagram of the memory subsystem of the data processing system which describes how the performance monitoring process analyzes this key operational area.

FIG. 3 is a block diagram of the memory subsystem of the data processing system which describes how the performance monitoring process analyzes this key operational area. This diagram illustrates three memory utilization scenarios 111, 112, and 113. In memory utilization scenario 111, the memory 14 of the data processing system is approximately 50 percent utilized. In memory utilization scenario 112, there is only approximately 9 percent of memory 14 free within the data processing system (approximately 91 percent utilized). In memory utilization scenario 113, the memory 14 is fully utilized (100 percent).

Referring back to FIG. 2, data collection phase of the performance monitor 1100 will collect the memory utilization information from a data collection site 1106 located in a table contained within the operating system software. In a preferred embodiment, this value will then be compared against two performance threshold levels established for memory utilization on this particular type of data processing system 116 by the performance monitor 1100. In an illustrative embodiment, memory utilization exceeding 90 percent will trigger a warning of an early warning performance bottleneck. Memory utilization of 100 percent will trigger a notification of an actual performance bottleneck.

The memory utilization of scenario A 111 (50 percent) will not exceed the utilization targets for either the early warning or actual performance thresholds, thus no message need be issued to the operator console 10.

The memory utilization of scenario B 112 (91 percent) will exceed the early warning performance threshold, but will not exceed the actual performance threshold. In this instance, a color coded message (preferably yellow) warning of an early warning performance bottleneck will be sent to the operator console 10.

The memory utilization of scenario C 113 (100 percent) will exceed both the early warning and actual performance thresholds for memory utilization. In this instance, a color coded message (preferably red) alerting the user of an actual performance bottleneck in the memory subsystem of the data processing system will be sent to the operator console 10.

Figure 4A:
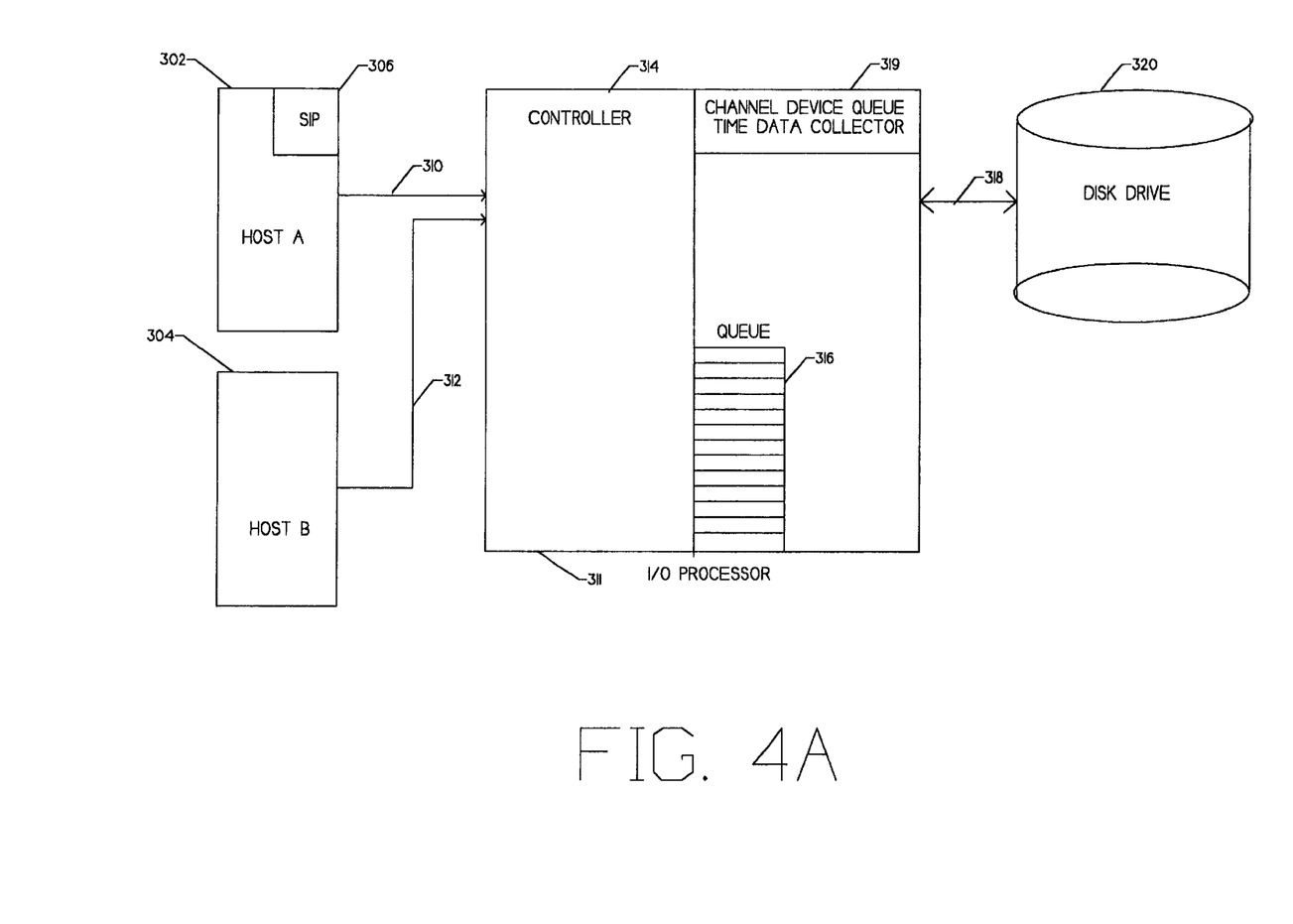
FIG. 4A is a block diagram of the I/O processor subsystem of the data processing system which describes how the performance monitoring process analyzes this key operational area.
Figure 4B:
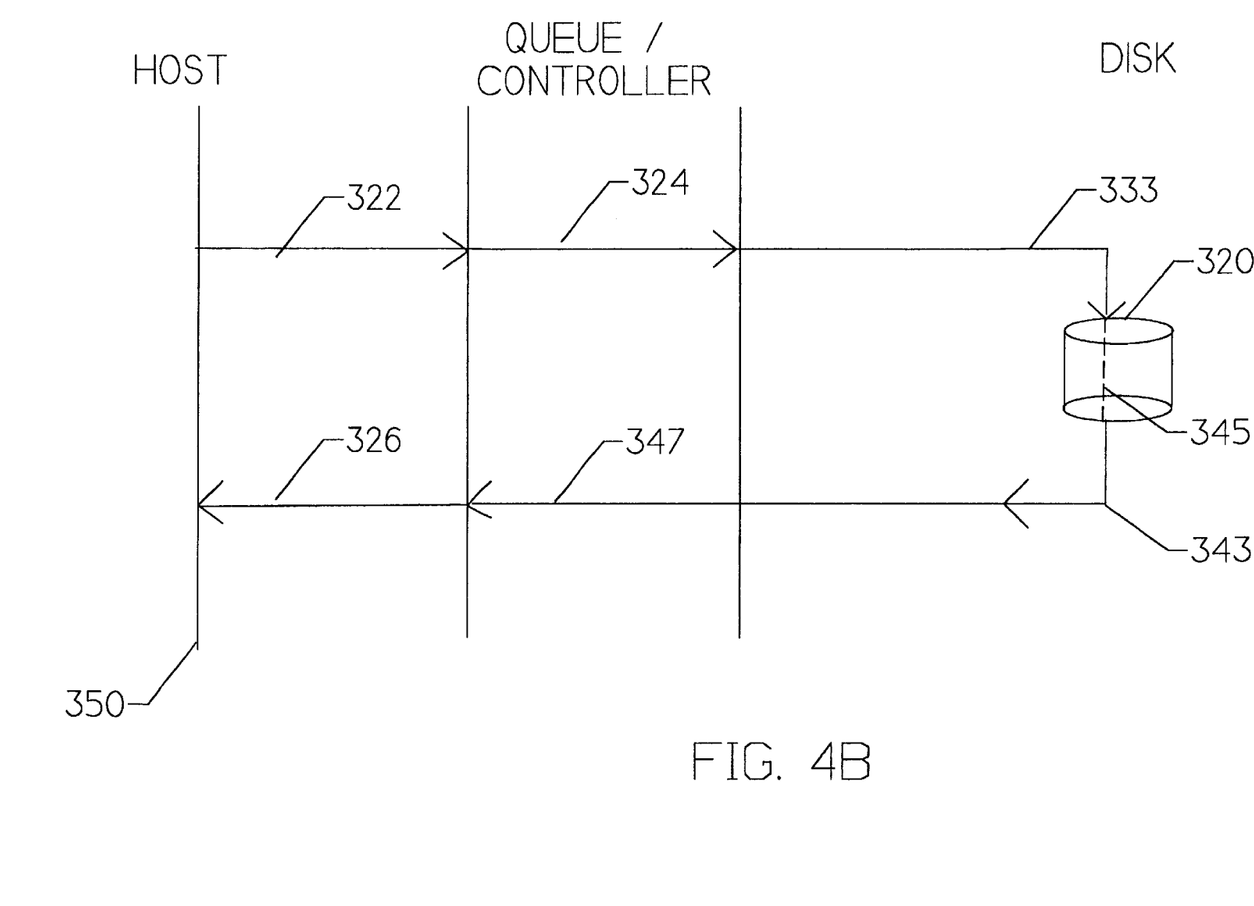
FIG. 4B is a timing diagram representation of a read/write operation from a host computer through the I/O processor to a peripheral device.

FIGS. 4A and 4B show a block diagram of the I/O processor subsystem of the data processing system which describes how the performance monitoring process analyzes this key operational area, and a timing diagram representation of a read/write operation from a host computer through the I/O processor to a peripheral device. In these figures, two host systems 302 and 304 are connected to the I/O processor 311 through interfaces 310 and 312. The I/O processor has a controller unit 314 which manages a queue of I/O requests 316 generated by the host systems 302 and 304. The I/O processor 311 is connected to a peripheral device, such as a disk drive 320 through interface 318. The controller 314 of the I/O processor 311 will process device requests such as a disk read or write awaiting execution on the queue, and issue the request to the appropriate peripheral device, such as disk drive 320. The disk drive 320 will process the request from the I/O processor 314, then return the operation result back to the I/O processor 314 for subsequent return to the requesting host system 302 or 304.

A timing diagram representing a read/write operation generated by a host computer is illustrated in 350 of FIG. 4B. A host system 302 or 304 generates a read/write request for data residing on a peripheral device such as disk drive 320. The request must first pass through an interface 310 or 312 connecting the host systems 302 or 304 with the I/O processor 311. The time to perform this operation is indicated by time segment 322 on timing diagram 350. Once the read/write request reaches the I/O processor, the request will be put in the channel device queue 316, awaiting execution. This time interval where the read/write request is residing in the queue 316 of the I/O processor 311 is known as the channel device queue time and is the key measurement of performance within the I/O Processor unit. The channel device queue time is represented on the timing diagram 350 by item 324. The channel device queue time cannot be measured directly, but can be calculated in a manner discussed later.

Once the read/write request reaches the beginning of the queue 316 and is processed by the controller within the I/O processor 314, the request is then sent via interface 318 to disk drive 320. On timing diagram 350, the amount of time required for the read/write request to reach the disk drive 320 is represented by 333.

After the read/write request reaches the disk drive 320, an amount of time 345 is required to actually perform the read/write request on the disk drive 320. This is represented on timing diagram 350 by item 345.

Upon completion of the read/write information on disk drive 320, the result of the read/write operation is sent back to the I/O Processor 314 through interface 318. This is represented on timing diagram 350 by item 343.

Once the result of the read/write operation reaches the I/O Processor 314, the result awaits dispatch back to the requesting host system 302 and 304. The amount of time the result is awaiting dispatch back to the requesting host system is represented on the timing diagram at 347.

Finally the result reaches the beginning of the queue within the I/O processor 311 and is sent by the controller 314 back to the appropriate requesting host system 302 or 304 through an interface 310 or 312. The amount of time the result spends passing through the interface is represented on timing diagram 350 by item 326.

As mentioned earlier, the key measuring point in the I/O request process for determining whether a performance bottleneck is present is the amount of time the request spends waiting in the channel device queue 316. This measurement is not directly available, but may be computed. When a read/write request is issued by a host system 302 or 304, a time stamp may be provided with the request to measure the total time required from dispatch of the request to receipt of the result. From this total request processing time, the amount of time 322 and 326 spent in the interface 310 and 312 between the host 302 and 304 and the I/O processor 322 and 326 is a known value and may be subtracted. Similarly, the amount of time spent 333 and 343 in the interface 318 between the I/O processor 311 and the disk drive 320 is also a known value and may be subtracted. The disk drive access time 345 is also known and can be subtracted from the total time. Finally, the amount of time 347 the result spends in the I/O Processor 311 awaiting dispatch back to the requesting host system 302 and 304 is also known and can be subtracted from the total time. After performing all of the subtractions from the total request processing time, only the channel device queue time 324 remains. During its normal background operation, the Software Instrumentation Package (SIP) 306 will determine the channel device queue time by the process described above, and place the result in a performance data collection site 319 in microcode which may then be read by the performance monitor 1100 during its collection phase.

Figure 5:
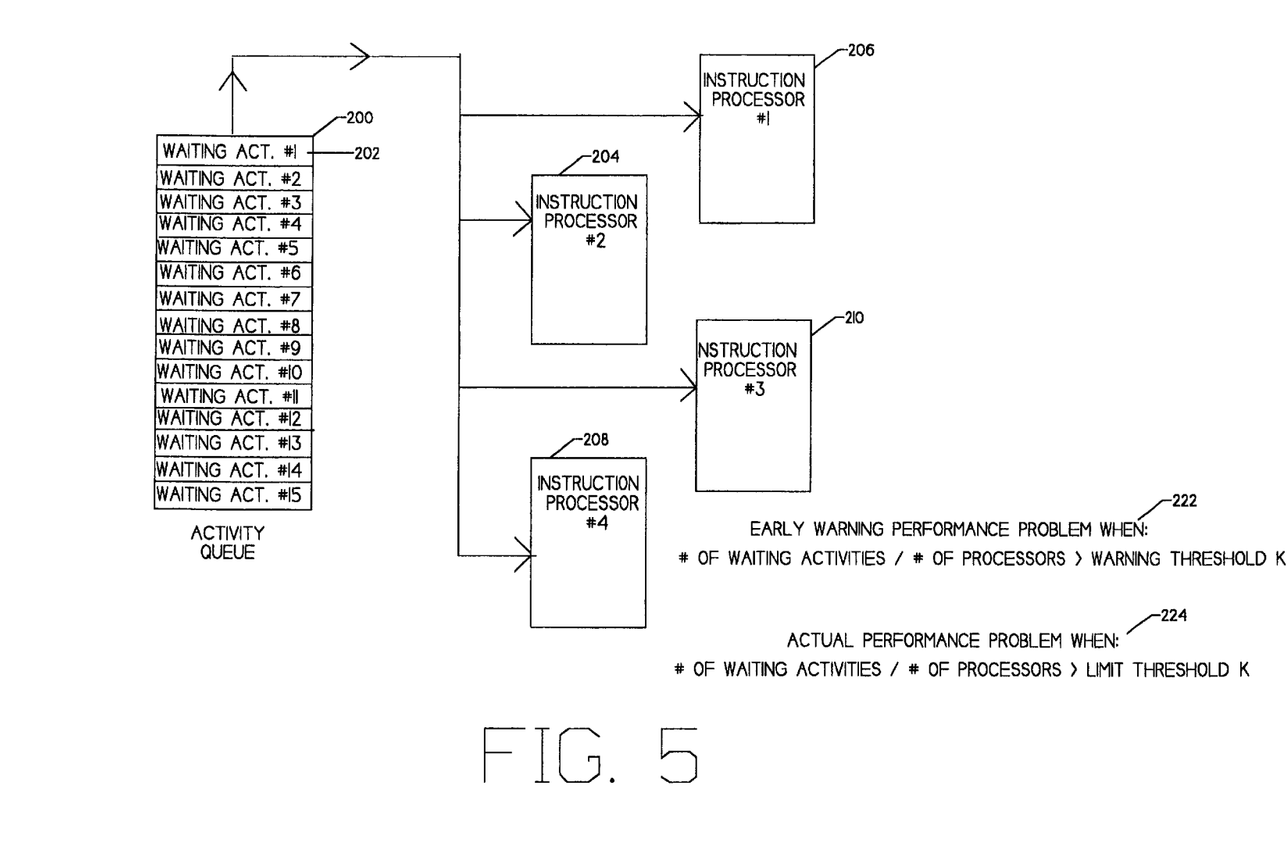
FIG. 5 is a block diagram of the instruction processor subsystem of the data processing system which describes how the performance monitoring process analyzes this key operational area.

FIG. 5 is a block diagram of the instruction processor subsystem of the data processing system which describes how the performance monitoring process analyzes this key operational area. An activity queue 200 contains a number of activities 202 which are awaiting execution by one or more instruction processors 204, 206, 208 and 210. When the waiting activities 202 reach the top of the queue 200 they are dispatched to an instruction processor 204, 206, 208, 210 for execution.

The Software Instrumentation Package (SIP) 306 will periodically sample the activity queue 200 to determine the number of activities 202 awaiting execution in the activity queue. SIP 306 will then take the number of activities 202 awaiting execution in the performance queue and divide this number by the number of instruction processors in the data processing system. This new value will represent the average number of activities awaiting execution per instruction processor in the data processing system. This number will be stored by SIP 306 in a performance data collection site 1110 which will later be collected by the performance monitor 1100. This number will then be compared against two or more performance thresholds.

In a preferred embodiment, the average number of activities awaiting execution per instruction processor will be compared against a warning threshold constant 222 to determine whether an early warning performance problem message should be issued to a computer operator. Similarly, the average number of activities awaiting execution per instruction processor is compared against a limit threshold constant 224 to determine whether an actual performance bottleneck alert message should be issued to a computer operator.

Figure 6:
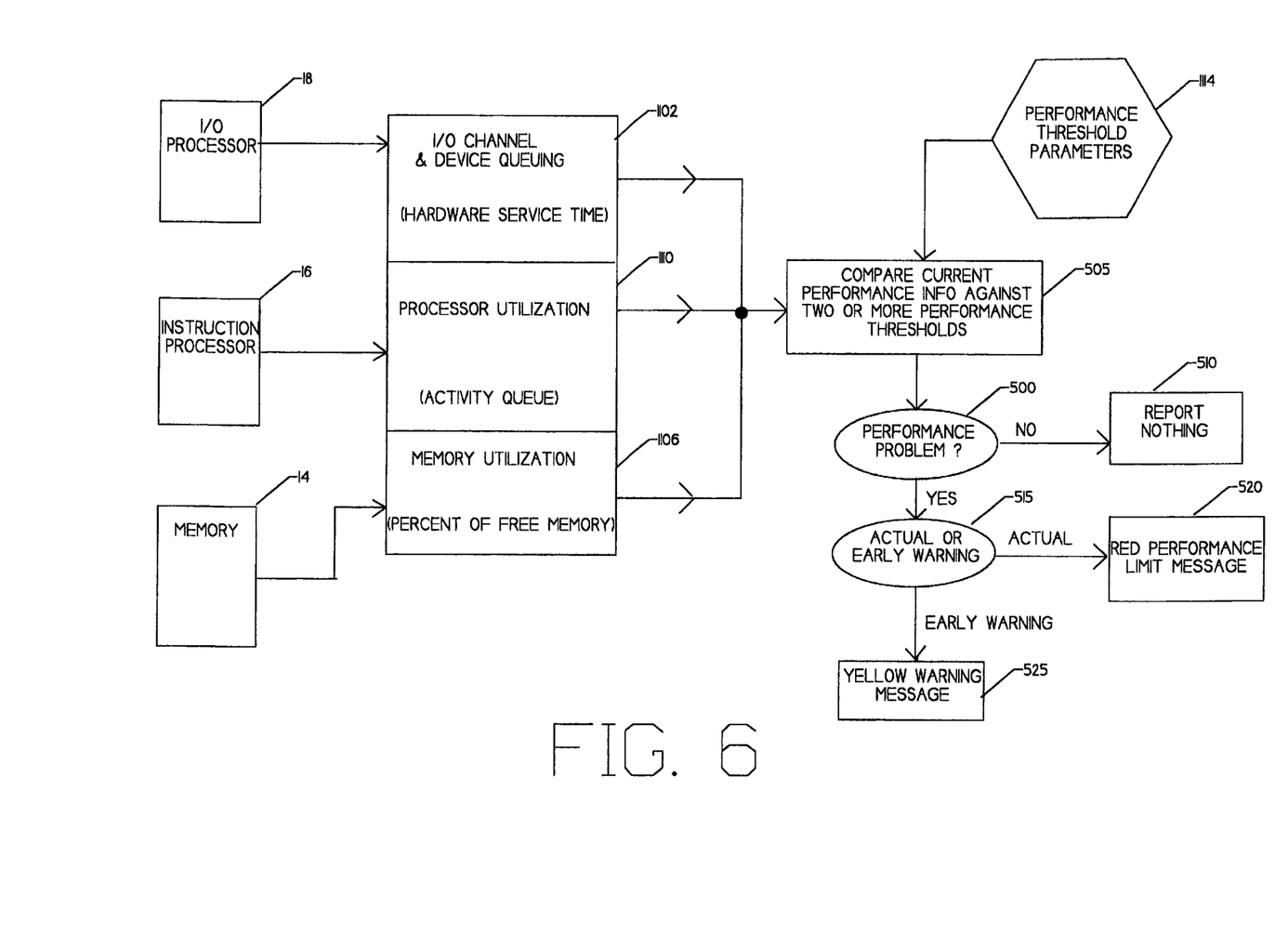
FIG. 6 is a detailed block diagram of the performance monitoring process particularly showing the multiple threshold feature of the present invention.

FIG. 6 is a detailed block diagram of the performance monitoring process particularly showing the multiple threshold feature of the present invention. In a preferred embodiment of the present invention, the Software Instrumentation Package (SIP) 306 periodically executes as a background job on the data processing system, gathering performance information from various subsystems within the computer system. SIP 306 will periodically write performance information to a set of data collection sites located within the hardware, microcode and operating system software of the computer system 1102, 1106 and 1110.

During the collection stage of the performance monitor 1100, information from the data collection sites 1102, 1106, and 1110 referenced in the preceding paragraph is periodically gathered. In a preferred embodiment these key operational areas include the I/O processor 18, the instruction processor 16, and the memory 14. The data collection site associated with the memory subsystem 1106 contains a value representing to percentage of total memory utilization, and is stored as a table value within the operating system software of the computer system. The data collection site associated with the I/O processor 1102 will contain channel device queue time values (hardware service time) and is stored in a microcode location. Finally, the data collection site for the instruction processor 1110 contains information relating to the number of entries in the activity queues and is stored within the operating system software of the data processing system.

The performance monitor then analyzes the information gathered from the performance data collection sites 1102, 1106 and 1110 and compares this data 505 against two or more performance thresholds 1114 within each of the three key operational areas 14, 16, and 18, thus identifying performance limiters. The performance threshold parameters 1114 may be predefined by the manufacturer, or configurable at the user site.

In an illustrative embodiment, two performance threshold levels (early warning and actual) are established for the performance criterion of memory utilization. The first of these performance threshold levels is defined such that if the memory utilization exceeds the 90 percent performance threshold, a performance problem is detected and further processing needs to be done 500. If the current memory utilization number gathered from the data collection site is less than 90 percent, no action is taken 510.

Once it is determined that the current memory utilization exceeds the example performance threshold (90 percent), a second test is performed to see if the current memory utilization is at 100 percent threshold 515. If so, a color coded (preferably red) informational message alerting the computer operator to the actual performance bottleneck is sent to the operator console 520. If not (the memory utilization falls between 90 and 100 percent), a color coded (preferably yellow) informational message alerting the computer operator to an early warning performance bottleneck is sent to the operator console 525.

Figure 7:
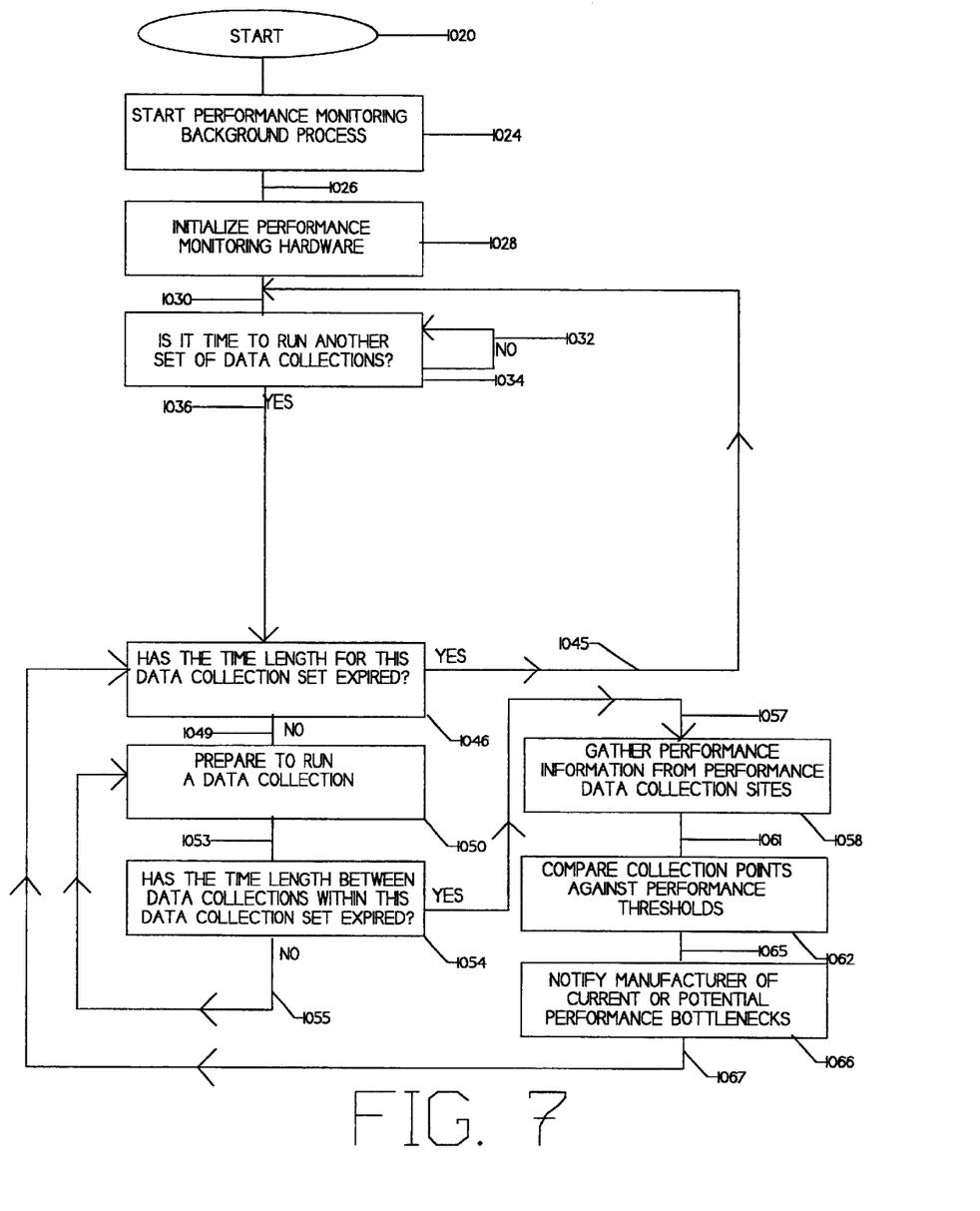
FIG. 7 is a flow diagram showing the basic operation of the performance monitoring system.

FIG. 7 is a flow diagram showing the basic operation of, the performance monitoring system. The algorithm is entered at start block 1020. Control is then passed to block 1024. Block 1024 starts the performance monitoring procedure on the host computer. In the preferred embodiment, the procedure runs as a background process on the host computer, and is started concurrently with other operating system software during the initial start up of the computer system. This procedure reads a set of user defined parameters, include a first parameter defining a time period between data point collections, a second parameter defining the total time length for a set of data point collections, and a third parameter defining the start time for running each of the sets of data point collections.

After the performance monitoring background process 1024 has been started, control is passed to block 1028 via interface 1026. Block 1028 performs any initialization (if necessary) of performance monitoring hardware storage locations. Although the computer system may contain several performance data collector sites in various subsystems of the computer, the automatic performance monitoring procedure preferably only obtains results from three of the computer subsystems, namely: 1) the instruction processor, 2) the memory, and 3) the input/output processor.

Block 1028 is coupled to block 1034 via interface 1030. Block 1034 determines whether it is time to run another set of data collection from the performance data collector sites. The time interval between sets of data collection is a user definable parameter. By default, and in the preferred embodiment, the time between samples is set to about 5 minutes. The performance monitoring background process is thus simply "put to sleep" between gatherings of the performance data collector sites 1032, thus minimizing the amount of processor resource required to perform the monitoring function, and promoting ease of use.

Block 1046 is coupled to block 1034 via interface 1036. Block 1046 is entered when it is determined that it is time to run another set of data collections. Block 1046 determines if the time length for a particular data collection set has expired. "Sets" of data collections can be set up to allow a number of collections to occur within a specified time interval. As an example, a set of ten data collections can be run one per minute for ten minutes, with the set of ten data collections being run once per hour. Thus, if a set of data collections is complete, the process is "put back to sleep" 1045 awaiting the trigger time to start another set of data collections. If the collection set has not been completely gathered, control is passed from block 1046 to block 1050 via interface 1049.

Block 1050 is essentially a waiting state between individual data collections within a set of data collections. In other words, if a set of ten data collections are to be run, one per minute, over the course of ten minutes, block 1050 will insure that the individual data collections are performed exactly on 1 minute intervals.

Block 1054 is coupled to block 1050 via interface 1053. Block 1054 will determine if the time length between data collections within the current data collection set has expired, and if so will begin the data collection process by passing control to block 1058 via interface 1057. If the time length between data collections has not expired, control is passed back to block 1050 via path 1055.

Block 1058 is where the performance monitor gathers information from performance data collection sites located within key operational areas of the data processing system. After the gathering of the performance information is complete, control is passed to block 1062 via interface 1061. Block 1062 is where the performance information gathered by the data collectors is compared against two or more performance thresholds within each of the key operational areas of the data processing system. This step may identify one or more performance limiters within the data processing system.

Block 1066 then receives control from block 1062 via interface 1065. Block 1066 will notify the computer operator of any performance limiters detected in block 1062. Upon completion of the notification phase, control is passed back to block 1046 via path 1067 to determine if any additional data collections within the current data collection set are required.

Figure 8:
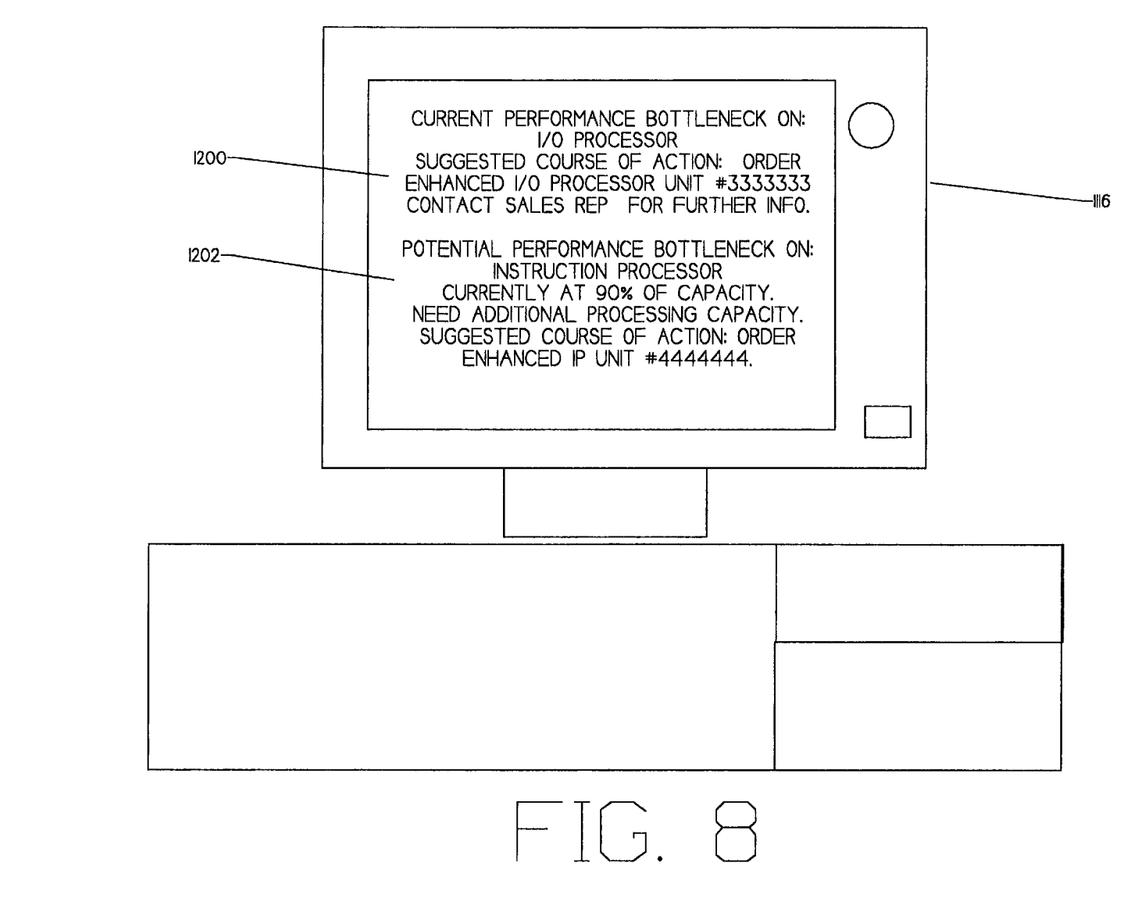
FIG. 8 is a graphical representation of the computer system operating console display after both early warning and actual performance limiters have been detected.

FIG. 8 is a graphical representation of a operator console display 1116 after the performance monitor 1100 has detected both an actual and an early warning performance limiter, and notified the computer operator of these performance problems via the console display 1116.

In this example, the performance monitoring process 1100 has detected an actual performance limiter in the I/O processor of the computer system. The console display 1116 contains a simple message 1200 indicating a performance problem, and a suggested course of action for correcting the problem (in this case, a part number for an enhanced I/O processor unit). In this preferred embodiment, the message 1200 will be color coded red, indicating an actual performance limiter.

A second message 1202 shown on the console display 1116 describes an early warning performance problem in the instruction processor subsystem. In this instance, the message provides the user with the actual percentage utilization of the subsystem. The message also includes a suggested course of action for correcting the problem (in this case, a part number for an enhanced instruction processor subunit). In this illustrative embodiment, the message 1202 will be color coded yellow, indicating an early warning performance limiter.

Having thus described the preferred embodiments of the present invention, those of skill in the art will readily appreciate that yet other embodiments may be made and used within the scope of the claims hereto attached.

What is claimed is:

1. An apparatus for monitoring performance of a computer system, the computer system having a plurality of performance data collection sites located within key operational areas of the computer system wherein normal operation of the computer system causes said data collection sites to contain updated performance information, comprising:

a. collecting means for gathering performance information from said performance data collection sites;

b. analysis means coupled to said collecting means for comparing said performance information against two or more performance thresholds within each said key operational area, thereby identifying a number of performance limiters;

c. notification means coupled to said analysis means for notifying a user of the computer system of said performance limiters;

wherein one of said performance thresholds is set to notify users of an early warning performance limitation;

wherein said notification means notifies the user of said early warning performance limitation through an informational message on a display means;

wherein said key operational areas identify one or more computer subsystems;

wherein the one or more computer subsystems are selected from a group consisting of an instruction processor subsystem, a memory subsystem, and an input/output subsystem;

wherein said informational message provides said user with suggestions of specific upgrade solutions that will alleviate the early warning performance limitation;

wherein said informational message is sent via electronic means; and wherein said informational message is color coded on said display means.

2. An apparatus according to claim 1 wherein said collecting means runs periodically.

3. An apparatus according to claim 2 wherein said computer system is a Unisys 2200 series mainframe computer.

4. An apparatus according to claim 2 wherein said computer system is a Unisys ClearPath IX computer.

5. An apparatus for monitoring performance of a computer system, the computer system having a plurality of performance data collection sites located within key operational areas of the computer system wherein normal operation of the computer system causes said data collection sites to contain updated performance information, comprising:

a. collecting means for gathering performance information from said performance data collection sites;

b. analysis means coupled to said collecting means for comparing said performance information against two or more performance thresholds within each said key operational area, thereby identifying a number of performance limiters; and c. notification means coupled to said analysis means for notifying a user of the computer system of said performance limiters;

wherein said collecting means runs periodically;

wherein said collecting means further comprises a set of user assignable parameters comprising a first parameter defining a time period between said data point collections, a second parameter defining a total time length for a set of data point collections, and a third parameter defining a start time for running each of said set of said data point collections.

6. An apparatus according to claim 5 wherein one of the performance limiters relates to processor utilization.

7. An apparatus according to claim 5 wherein one of the performance limiters relates to memory utilization.

8. An apparatus according to claim 5 wherein one of the performance limiters relates to input/output performance.

9. An apparatus according to claim 5 wherein one of said performance thresholds is set to notify users of an early warning performance limitation.

10. An apparatus according to claim 9 wherein said notification means notifies the user of said early warning performance limitation through an informational message on a display means.

11. An apparatus according to claim 10 wherein said key operational areas identify one or more computer subsystems.

12. An apparatus according to claim 11 wherein the one or more computer subsystems are selected from a group consisting of an instruction processor subsystem, a memory subsystem, and an input/output subsystem.

13. An apparatus according to claim 12 wherein said informational message provides said user with suggestions of specific upgrade solutions that will alleviate the early warning performance limitation.

14. An apparatus according to claim 13 wherein said informational message is sent via electronic means.

15. An apparatus according to claim 5 wherein one of said performance thresholds is set to notify said users of an actual performance limitation.

16. An apparatus according to claim 15 wherein said notification means notifies said user of an actual performance limitation through an informational message on a display means.

17. An apparatus according to claim 16 wherein said key operational areas identifies one or more computer subsystems.

18. An apparatus according to claim 17 wherein the one or more computer subsystems are selected from a group consisting of an instruction processor subsystem, a memory subsystem, and an input/output subsystem.

19. An apparatus according to claim 18 wherein said informational message provides said user with suggestions of specific upgrade solutions that will address said actual performance limitations.

20. An apparatus for monitoring performance of a computer system, the computer system having a plurality of performance data collection sites located within key operational areas of the computer system wherein normal operation of the computer system causes said data collection sites to contain updated performance information, comprising:

a. collecting means for gathering performance information from said performance data collection sites;

b. analysis means coupled to said collecting means for comparing said performance information against two or more performance thresholds within each said key operational area, thereby identifying a number of performance limiters;

c. notification means coupled to said analysis means for notifying a user of the computer system of said performance limiters;

wherein one of said performance thresholds is set to notify said users of an actual performance limitation;

wherein said notification means notifies said user of an actual performance limitation through an informational message on a display means;

wherein said key operational areas identifies one or more computer subsystems;

wherein the one or more computer subsystems are selected from a group consisting of an instruction processor subsystem, a memory subsystem, and an input/output subsystem;

wherein said informational message provides said user with suggestions of specific upgrade solutions that will address said actual performance limitations; and     wherein said message will be color coded on said display means indicating an actual performance limitation.

21. An apparatus according to claim 20 wherein said informational message is sent via electronic means.

22. An apparatus for monitoring performance of a computer system, the computer system having a plurality of performance data collection sites located within key operational areas of the computer system wherein normal operation of the computer system causes said data collection sites to contain updated performance information, comprising:

a. collecting means for gathering said performance information from said performance data collection sites, wherein said collecting means further comprises a set of user assignable parameters comprising a first parameter defining a time period between said data point collections, a second parameter defining the total time length for a set of data point collections, and a third parameter defining the start time for running each of said sets of said data point collections;

b. analysis means coupled to said collecting means for comparing said performance information against two or more performance thresholds within each said key operations area, thereby identifying a number of performance limiters; and     c. notification means coupled to said analysis means for notifying a user of the computer system of said performance limiters.

23. A data processing system according to claim 22 wherein said key operational areas comprise instruction processor utilization, memory utilization, and input/output performance.

24. A method for monitoring performance of a computer system comprising:

a. gathering a set of performance information from a set of performance data collection sites located within key operational areas of the computer system;

b. comparing said set of performance information against two or more performance thresholds within each said key operational area in order to identify a set of performance limiters;

c. delivering a notification to a computer operator of any of said performance limiters;

wherein said gathering further comprises a set of user assignable parameters comprising a first parameter defining a time period between said data point collections, a second parameter defining the total time length for a set of data point collections, and a third parameter defining the start time for running each of said sets of said data point collections.

25. A method for monitoring performance of a computer system comprising:

a. gathering a set of performance information from a set of performance data collection sites located within key operational areas of the computer system;

b. comparing said set of performance information against two or more performance thresholds within each said key operational area in order to identify a set of performance limiters;

c. delivering a notification to a computer operator of any of said performance limiters;

wherein said performance thresholds further comprises early warning performance problems and actual performance problems.

26. A method according to claim 25 wherein a message outlining a recommended course of action for addressing said early warning performance problems is sent to said computer operator whenever said early warning performance problems are projected.

27. A method according to claim 26 wherein said message is color coded on a display means indicating said early warning performance problem.

28. An method according to claim 27 wherein said message is sent via electronic means.

29. A method according to claim 25 wherein a message outlining a recommended course of action for addressing said actual performance problems is sent to said computer operator whenever said actual performance problems exist.

30. A method according to claim 29 wherein said message is color coded on a display means indicating said actual performance problem.

31. An method according to claim 30 wherein said message is sent via electronic means.

* * * * *